3,121,106
PREPARATION OF HALOGEN SUBSTITUTED PHOSPHORIC ACID ESTERS

Georges Nagy, Montrouge, France, assignor to Manufacturers de Produits Chimiques de Nord Etablissements Kuhlmann, Paris, France, a corporation of France
No Drawing. Filed Mar. 28, 1961, Ser. No. 98,759
Claims priority, application France Mar. 30, 1960
1 Claim. (Cl. 260—461)

In French Patent No. 1,198,196 filed June 6, 1958, there was described a method of preparing halogen-containing phosphoric acid esters, especially halogen-containing alkyl phosphates, which basically comprises reacting a phosphoric acid oxy-halide with a primary alcohol halogen-substituted in alpha and beta positions in the presence of a catalyst essentially comprising a metal of the second group of the periodic table. The halogen-substituted alkyl phosphates which are among the preferred phosphoric acid esters obtainable by that method can be represented by the following general formula $$PO(OCH_2-CX-CHX-R_2)_3$$
$$\phantom{PO(OCH_2-}|$$
$$\phantom{PO(OCH_2-}R_1$$

or $$PO-(OR)_3$$

wherein $R_1$ is a hydrogen atom or an alkyl radical, $R_2$ a hydrogen atom, an alkyl radical or an aryl radical, and X a halogen.

Further in accordance with the earlier method referred to above, the phosphoric acid ester contained in the crude reaction product obtained is neutralized with an epoxy compound. For that purpose, ethylene oxide or propylene oxide may for example be used, in the stoichiometric amount with respect to the acid ester. The oxide reacts with the hydroxyl group and yields a mixed ester by the reaction

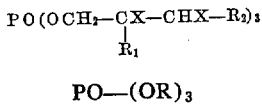
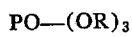

wherein R, $R_1'$ and $R_2'$ have the meanings previously indicated for $R_1$ and $R_2$.

The halogen-substituted phosphoric acid esters produced as just described have valuable uses as fireproofing or ignifuge agents in thermoplastic and thermosetting resins, per se or compounded in various compositions such as paints, varnishes, coatings, laminates and the like.

The presence of this mixed ester in the triester product results in a number of drawbacks.

In the first place, the mixed ester undergoes by the action of heat an intramolecular and/or inter-molecular alcoholysis with one or more molecules of mixed ester or triester, forming a phosphate which condenses and an alcohol which is released, in accordance with the reaction

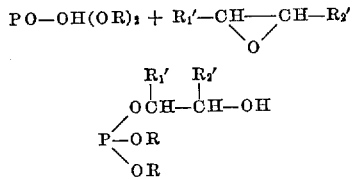

This alcoholysis results in an increase in the viscosity of the product and the liberation of the volatile alcohol is especially troublesome where the phosphate is used as a fire-proofing addition for plastics, causing exudation, decrease in the hardness of polyester laminates and similar objectionable effects.

Furthermore, after prolonged storage in the presence of humid air the oxyalkyl phosphoric acid ester undergoes a change, clouding over first at the surface then becoming turbid and opalescent throughout. The presence of the hydrophilic hydroxyl groups increases the water-solubility of the product and facilitates hydrolysis of the ester bond.

Lastly, in polyester laminates containing fire-proofing additions of the oxy-alkyl-neutralized, halogen-substituted phosphoric acid esters, it is found that the sheets tend to bleach or discolor, an effect that is not present when pure triester is used. Such discoloring is, apparently, ascribable to the presence of the free alcohol groups in the mixed ester and to the incompartibility thereof with the conventional sizing and the like compositions commonly used in connection with fibre glass mats and the like.

It is an object of this invention to improve on the aforementioned method of preparing halogen-substituted phosphoric acid esters so as to eliminate the shortcomings and problems heretofore encountered and achieve additional advantages to be specified below. I have discovered that this can quite simply be achieved if the hydroxyl group of the mixed ester is blocked by acylation. For that purpose, the improved method of preparing halogen-containing phosphoric acid esters by reacting a phosphoric acid oxyhalide with a primary alcohol containing alpha-beta halogen-substituted primary alcohol, in the presence of a catalyst comprising a metal of the second group of the periodic table and neutralizing with an epoxy compound, is characterized in accordance with the present invention, in that the hydroxyl groups formed in the reaction between the phosphoric acid ester and the epoxy compound are esterified with a suitable fatty acid derivative, preferably of the type having a short carbon chain.

As the esterifying derivative, ketenes and anhydrides of fatty acids may be used. The ketenes may be used in the free state or under the form of addition products with a suitable ketone. For instance, an acetylating agent can be ketene, isopropenyl acetate (acetone enol-acetate), and acetic anhydride and acid. Acetylation through gaseous ketene takes place by bubbling the ketene at about 50° C. into the phosphoric ester. Isopropenyl acetate reacts with the alcohol groups whereby acetone and acetic ester are formed as by-products. Esterification is effected by simultaneous heating and distilling of the formed acetone. When acetic anhydride is used, complete acetylation is obtained when the mixture is heated one hour at 100° C. The acetic acid formed is then removed by distillation in vacuo. The acidic phosphoric acid esters contained in the crude reaction mixture are then converted into a mixed ester having the general formula $$PO(OR)_2(OCHR_1'-CHR_2'-OOC-R_3')$$

wherein R, $R_1$ and $R_2$ have the same meanings as above and $R_3$ represents an alkyl group. The said halogen-containing phosphoric acid esters possess high heat stability and also a greatly improved resistance to moisture owing to the absence of any hydrophilic grouping in their molecule.

The method of the invention may be carried out in any suitable apparatus, such as a double-walled autoclave provided with an anchor-type agitator, a riser column filled with Rasching rings, a thermoelectric temperature probe, a tube for the addition of the reagents, a dipper tube for the delivery of nitrogen and possibly the epoxy compound in gaseous form, and a safety pressure release device e.g. valve or burst disk. Temperature control is effected by circulation of a suitable intermediate fluid, e.g. of the diphenyl/diphenyl oxide type.

The Raschig-ring filled column is provided at its top with a reflux head and a spiral condenser for recycling the vesicles of phosphoric acid oxychloride entrained with the hydrochloric acid stream during esterification. The condenser is connected with absorbed columns which are also filled with Raschig rings and arranged to operate in counterflow relation. The reflux head is connected through a downflow cooler with receiver flasks serving to collect the lighter fractions during the vacuum distillation.

Two exemplary procedures for carrying out the method of the invention are now described for purposes of illustration but not of limitation.

*Example 1*

2.022 parts by weight of distilled 2,3-dibromopropanol-(1) and 459 parts phosphoric acid oxychloride are mixed at ordinary temperature. 0.6 part magnesium turnings amalgam and 10 to 30% of the extemporaneously prepared mixture are placed into the reactor. It will be understood that in case of an industrial-scale rather than a laboratory process, it would be convenient to introduce both reagents concurrently through separate metering pumps or feeders. The mixture is then heated gradually to 100–105° C. while bubbling nitrogen through it. The reaction is initiated at about 60° C. Into the reaction mass heated so as to remain at a temperature of about 100–105° C., the remaining reagents are then introduced so as to cause a large, but not a violent, rate of hydrochloric acid discharge. After all of the reagents were introduced, the mixture is heated for a further half hour at 105° C., and the negative pressure is gradually applied at the outlet from the absorbers. The temperature of the reaction mixture is then gradually raised to 130° C. and maintained at that point until no more hydrochloric acid is released. Then nitrogen gas is bubbled through to produce de-gasification at reduced pressure. The esterification is completed in about 4 to 5 hours. An aliquot part has then been taken to precise the acidity due to the acidic phosphoric esters. The itration is realized by alkalimetry in an ethanol-ethylacetate medium, the indicator used being bromothymol blue. The acidity is of about 0.2–0.3 gr. equival./kg., which corresponds to a content of approximately 10–15% of phosphoric diester.

The reaction mixture is then cooled to 90–100° C., under which the temperature calculated rate, or preferably a slight excess (from 22 to 33 parts) of ethyleneoxide is introduced. After one hour, the fixation is practically completed, which is confirmed through alkalimetric checking.

Then the stoichiometric quantity, or preferably a slight excess, of acetic anhydride (44 to 66 parts relatively to the acidity of the raw esterification product) is introduced and one heats for 1 hour to 100° C. After said time, the hydroxyl groups are wholly esterified, the formed acetic acid is removed, with a possible excess of acetic anhydrid, under vacuo of 40 mm. Hg.

The volatile by-products formed during esterification (and chiefly comprising chlorodibromopropane) and the excess dibromopropanol are distilled away by gradually heating the liquid to 150° C. at a pressure of 1 mm. Hg. In this way 1,854 parts of tris (2,3-dibromopropyl) phosphate of technical grade were obtained, which was found to have the following analysis and characteristics:

Br (found): 67.6% (computed 68.725%)
P (found): 4.36% (computed 4.438%)
Viscosity at 20° C.: 4,700 centistokes
Color index: 30 alpha
$d_{20}^{20} = 2.272$
$n_D^{20} = 1.571$ The resulting halogen-substituted phosphor ester is found to possess excellent fireproofing characteristics.

*Example 2*

The esterification has been completed according to Example 1; then, after neutralizing of the raw ester by means of ethylene oxide (as epoxy compound), gaseous ketene has been bubbled through the phosphoric acid at about 50° C.; a stoichiometric quantity (or a slight excess) of ketene (18 to 27 g. in function to the acidity of the raw esterifying product) has been introduced. The excess of epoxy compound and ketene has thereafter been removed, if necessary, by degasification at reduced pressure.

The volatile by-products formed during esterification have been distilled off as explained in Example 1. There has been obtained 1,840 parts of technical tris(2,3-dibromopropyl) phosphate, having the same physical characteristics as in Example 1.

It should be noted that the method of the invention can conveniently be carried out in a single apparatus in which all of the various operating steps involved can readily be performed, including a neutralization of the crude ester by oxyalkylation and the subsequent esterification of the free alcohol groups in the mixed ester with a suitable fatty acid derivative.

Important advantages of the method of this invention over the conventional techniques include:

(1) In the conventional method the crude halogen substituted phosphoric acid ester, which is both too dense and too viscous to be subjected without further treatment to the necessary acidic and alkaline washing steps, must first be diluted with an appropriate solvent. After the washing steps, the solvent must be removed and recovered. With the present method on the other hand the procedure is greatly simplified since the use of a solvent and of the washing steps is unnecessary, as well as the troublesome sedimentation and distillation operations for recovering the solvent.

(2) In the conventional method the alkaline washing step has resulted in a loss of the phosphoric acid esters since these are carried into the washing solution. With the process of the invention such acidic phosphates can be retained in the form of a neutral mixed ester in the final product, thereby resulting in an increase in yield by a factor of 10 to 15%. The presence of the mixed ester does not significantly affect the halogen content in the phosphate product and leaves the fireproofing properties of the product practically unchanged.

What I claim is:

A neutral halogen-substituted phosphoric acid ester of the formula:

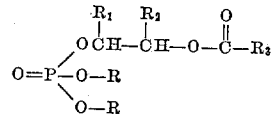

wherein R is

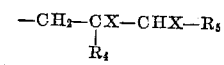

$R_1$ is selected from the group consisting of hydrogen and lower alkyl, $R_2$ is selected from the group consisting of hydrogen and lower alkyl, $R_3$ is a lower alkyl, $R_4$ is selected from the group consisting of hydrogen and lower alkyl, $R_5$ is selected from the group consisting of hydrogen and lower alkyl, and X is a halogen atom.

References Cited in the file of this patent

UNITED STATES PATENTS

| | | |
|---|---|---|
| 2,791,574 | Lanham | May 7, 1957 |
| 2,830,069 | Smith | Apr. 8, 1958 |
| 2,909,559 | Lanham | Oct. 20, 1959 |

FOREIGN PATENTS

| | | |
|---|---|---|
| 1,198,196 | France | June 8, 1959 |

UNITED STATES PATENT OFFICE
CERTIFICATE OF CORRECTION

Patent No. 3,121,106            February 11, 1964

Georges Nagy

It is hereby certified that error appears in the above numbered patent requiring correction and that the said Letters Patent should read as corrected below.

Column 3, line 42, for "itration" read -- titration --.

Signed and sealed this 30th day of June 1964.

(SEAL)
Attest:

ERNEST W. SWIDER            EDWARD J. BRENNER
Attesting Officer            Commissioner of Patents